United States Patent
Mathieu et al.

[11] Patent Number: 5,852,636
[45] Date of Patent: Dec. 22, 1998

[54] METHOD OF AND APPARATUS FOR MODULATION OF FSK CARRIER IN A VERY NARROW BAND

[75] Inventors: Serge Mathieu, Beauport; Dominic Tremblay, Québec, both of Canada

[73] Assignee: Serge Mathieu, Beauport, Canada

[21] Appl. No.: 908,936

[22] Filed: Aug. 8, 1997

[51] Int. Cl.$^6$ .................................................. H04B 1/44
[52] U.S. Cl. ...................... 375/272; 375/303; 375/295; 332/100; 455/113
[58] Field of Search ...................... 375/295, 303, 375/305, 306, 308, 309, 269, 272, 273, 274, 275, 323, 279, 280; 455/113, 118; 332/100

[56] References Cited

U.S. PATENT DOCUMENTS

| | | |
|---|---|---|
| 3,023,269 | 2/1962 | Maniere et al. ...................... 375/323 |
| 3,987,374 | 10/1976 | Jones, Jr. . |
| 4,090,138 | 5/1978 | Voorman et al. . |
| 4,234,852 | 11/1980 | McCorkle . |
| 4,403,331 | 9/1983 | Halpern et al. . |
| 4,467,140 | 8/1984 | Fathauer et al. . |
| 4,488,120 | 12/1984 | Carsten . |
| 4,516,087 | 5/1985 | Bruene ...................... 332/100 |
| 4,538,136 | 8/1985 | Drabing . |
| 4,577,333 | 3/1986 | Lewis et al. . |
| 4,585,998 | 4/1986 | Veillard . |
| 4,669,094 | 5/1987 | Van Rumpt . |
| 4,688,234 | 8/1987 | Robinton ...................... 375/227 |
| 4,694,471 | 9/1987 | Blesser . |
| 4,697,260 | 9/1987 | Grauel et al. . |
| 4,745,391 | 5/1988 | Gajjar . |
| 4,866,771 | 9/1989 | Bain . |
| 5,103,461 | 4/1992 | Tymes . |
| 5,193,222 | 3/1993 | Sasaki . |
| 5,222,079 | 6/1993 | Rasor . |
| 5,428,600 | 6/1995 | Potier . |
| 5,432,814 | 7/1995 | Hasegawa . |
| 5,443,888 | 8/1995 | Fukuchi ...................... 375/307 |
| 5,450,032 | 9/1995 | Mimura et al. ...................... 375/324 |
| 5,526,129 | 6/1996 | Ko . |
| 5,528,621 | 6/1996 | Heiman et al. . |
| 5,706,310 | 2/1995 | Wang et al. ...................... 375/296 |

*Primary Examiner*—Jason Chan
*Assistant Examiner*—Congvan Tran
*Attorney, Agent, or Firm*—Francois Martineau

[57] ABSTRACT

A method and a transmitter system is provided for modulating binary information on a frequency shift keying carrier in a very narrow band. Phase reversal keying is initially used to create a carrier. The transmitter of the present invention generates a carrier signal by modulating a reference signal and a control signal having two frequencies representing the binary data to be transmitted. The resulting phase reversal carrier signal is processed by high order filtering such that the output of the transmitter provides a frequency shift keyed carrier at very close frequencies. The resulting carrier signal may, at the receiver, be processed by very narrow band filtering so as to create a communication system which will use only a small part of the available spectrum.

17 Claims, 3 Drawing Sheets

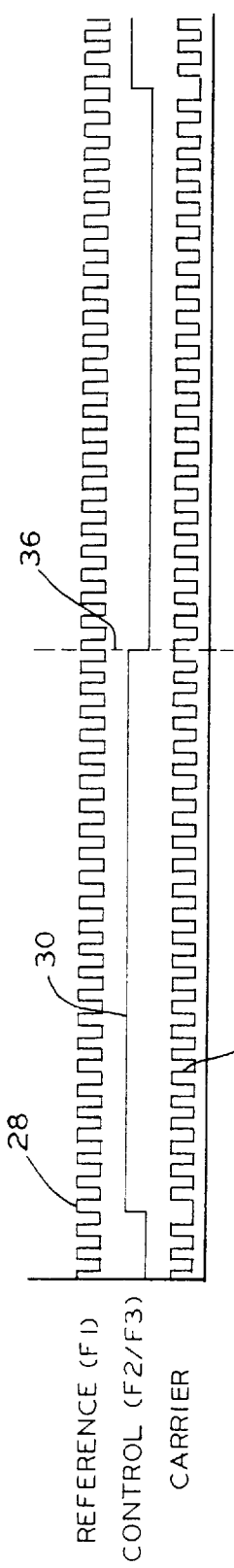
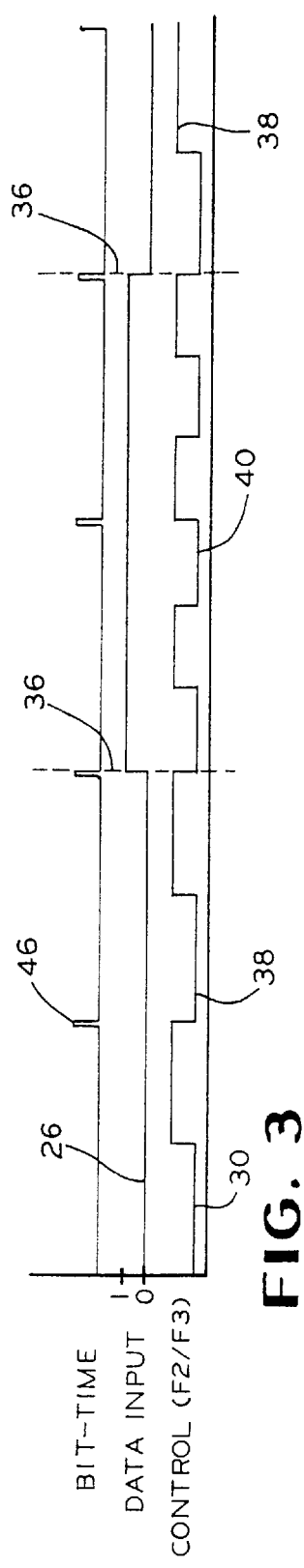
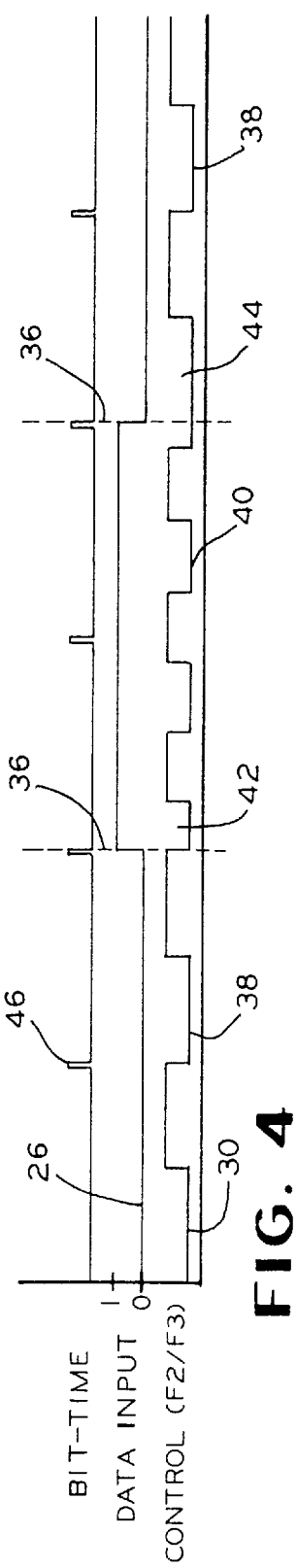

METHOD OF AND APPARATUS FOR MODULATION OF FSK CARRIER IN A VERY NARROW BAND

BACKGROUND OF THE INVENTION

1. Field of the Invention.

The present invention relates to a Frequency Shift Keying (FSK) technique which includes a digital circuit for synthesizing wave forms showing a large frequency spectrum, and a high order filter with a narrow band for providing a low harmonic output. A transmitter with frequency shift keying carrier signal is obtained by using a digital circuit to generate a reference signal and a control signal. The reference signal and control signal are modulated using a Phase Reversal Keying (PRK) technique. High order filtering provides an FSK carrier at very close frequencies.

2. Summary of Related Art.

The use of digital signals often requires transmission of digital data over narrow band communication channels. Voice bandwidth channels transmitted over microwave and satellite links may be required to carry digital data. Power line communications requires the transmission of digital information via one or more power lines. In offices and industrial buildings, power line communication allows for the transmission of data information among computer terminals, printers, process equipment, and other control equipment. Since power lines already exist in facilities which require local data transmission, reliable data transmission through the power lines produces significant cost savings by not having to run dedicated data lines.

A number of techniques are commonly used for transmission of digital signals. Systems will utilize a carrier which may be modulated by phase reversal keying, by on-off keying, by phase shift keying, or by frequency shift keying. The information is modulated onto a carrier signal and the carrier signal is suitably applied to the power line. At the receiving end, a demodulator receives and processes the carrier signal and a decision is made as to which level of a binary signal was transmitted. The receiver device is coupled to the power line which demodulates the carrier signal to recover the information and provide the desired binary output signal.

In a power line communications system, the modulated signals may have a frequency of 5 kHz. to 500 kHz. Other communication systems may concurrently use the same network at different frequencies. There is often a problem with an intermixing of the various signals on the power lines which may result in distortion or loss of the information desired to be transmitted.

To obtain improved performance for reception of binary signals, it is preferable to concentrate the transmitted signals within a very narrow band. In this fashion, the receiver may use a narrow band filter, tuned on the transmitter frequencies, and thus dampening the background noise and signals present on the communication medium. Such a system will therefore show an enhanced level of performance compared to any other system having a larger bandwidth, while enabling the sharing of this medium by several users.

The most widely used technique for binary modulation in a very narrow band is "phase reversal keying" (PRK). Phase reversal keying uses a carrier whose nominal frequency is stationary and corresponds to that of the receiving filter. The information is modulated by inverting the phase of the carrier. Upon reception of the signal, the system detects phase shifts from the carrier and senses the shifts of symbols rather than the value of the modulated symbol.

Transmitters using the phase reversal keying technique often result in certain problems which the present invention efficiently solves. The conventional phase reversal keying does not carry an absolute reference to enable the receiver to directly associate the carrier signal to a binary symbol. This type of system must then establish a convention at the beginning of each transmission so as to allow determination of the binary value of the modulated symbol. The absence of absolute reference makes it more difficult to implement a multiple access/collision detection network, particularly at the level of detection of collision in a preamble modulated in amplitude shift keying, as disclosed by Vander Mey et al. (U.S. Pat. No. 5,090,024). Moreover, the phase reversal keying modulation with a narrow band filter generates a carrier signal whose envelop resembles a sinusoid. This fact decreases the "crest factor" of the resulting signal, and degrades the signal to noise ratio of the system. The present invention provides a significant improvement in the "crest factor" of the modulated carrier, thus improving the noise tolerance in the band. The modulation technique of the present invention generates a substantially constant envelope, whose "crest factor" is close to 1.

Transmitters and receivers using frequency shift keying techniques and/or power line communication are described in various U.S. Patents. Veillard (U.S. Pat. No. 4,585,998) discloses the coherent demodulation of a carrier digitally modulated by phase shift or frequency shift with phase continuity. The carrier frequency is squared, shifted by an adjustable amount, and applied to a narrow band pass filter. The output of the filter is compared to a threshold and the frequency shift is modified until the amplitude exceeds the threshold.

Halpern et al. (U.S. Pat. No. 4,403,331) teaches a method using an improved signal design having a large number of signal coordinates. Digital signals utilize a carrier which may be modulated by on-off keying, frequency shift keying or phase shift keying. Voorman et al. (U.S. Pat. No. 4,090,138) discloses a transmitter which generates an amplitude modulated FSK signal which is applied directly as a modulation signal to a carrier modulator without the intermediary of a band-pass filter.

Lewis et al. (U.S. Pat. No. 4,577,333) discloses a composite shift keying modulation technique which provides enhanced error detection capability in a noisy transmission medium, such as an AC power line. Gajjar (U.S. Pat. No. 4,745,391) teaches a method for the coupling of power line communication signals to a distribution conductor carrying the power frequency currents to system loads which minimizes the impedance seen by the power frequency currents.

Additional power line communication techniques are disclosed in Drabing (U.S. Pat. No. 4,538,136) and McCorkle (U.S. Pat. No. 4,234,852). Drabing discloses a shift keyed signal which includes a first frequency and a second frequency for indicating the binary data. McCorkle teaches a frequency shift key detector for demodulating mark and space tone frequency shifts from a carrier frequency.

Grauel et al. (U.S. Pat. No. 4,697,260) teaches the use of FSK in a radio transmission system. Transmission of digital messages from a stationary radio station to mobile radio stations is effected by wideband code division multiplex modulation, and transmission from the mobile stations to the stationary station is effected by narrowband frequency multiplex modulation. This technique reduces bandwidth requirements and improve the signal-to-noise ratio for each direction of transmission.

Tymes (U.S. Pat. No. 5,103,461) and Heiman et al. (U.S. Pat. No. 5,528,621) show the modulation of a carrier using frequency shift keying with a narrow-band direct sequence. Sasaki (U.S. Pat. No. 5,193,222) also discloses a technique for frequency shift keying modulation used with a narrow band pass filter.

Potier (U.S. Pat. No. 5,428,600) teaches a binary frequency shift keying for narrow band modulation. A repeater includes a filter for separating narrow-band signals. A change of frequency is effected from the broadband signal, and the narrow-band signals are phase-modulated by the broad-band signals after the change of frequency. The frequency change is adjusted to preserve a buffer frequency separation between the sub-carrier and its phase modulation.

Hasegawa (U.S. Pat. No. 5,432,814) teaches a spread spectrum communication system utilizing a frequency hopping method and a primary modulation performed in accordance with a binary frequency shift keying. Ko (U.S. Pat. No. 5,526,129) discloses a waveform shaping method for converting clock pulses to sinusoidal form for generating a sinusoidal time-based correction signal in a narrow third frequency bank.

SUMMARY OF THE INVENTION

In accordance with the present invention, there is provided a method and a transmitter system for modulating binary information on a carrier in a very narrow band by frequency shift keying carrier signal. Instead of the direct use of the frequency shift keying technique, a phase reversal keying technique is used to create a carrier with frequency shift characteristics. The transmitter of the present invention generates a reference signal and a control signal, the latter having two frequencies to represent the binary data to be transmitted. A carrier signal is generated by modulation using a phase reversal keying technique. The resulting carrier signal is processed by high order filtering such that the output of the transmitter provides a frequency shift keyed carrier at very close frequencies.

At the transmitter, the synthesis of signals with two or more frequencies which are very close to one another takes place to represent the two binary states. The resulting carrier signal may, at the receiver, be processed by very narrow band filtering so as to create a communication system which will use only a small part of the available spectrum. The very narrow band filtering provides an improved signal to noise ratio.

The present system will mobilize only a small segment of the total available spectrum, thus enabling medium sharing with several other users with different carriers. With the present invention, less than 0.75% of the spectrum from 5 kHz. to 500 kHz. is typically used.

Using conventional methods, it is complex and expensive to synthesize two precise frequencies that are stable and very close to one another. Such synthesis is even more complex for sinusoidal waveforms with low harmonic content. An object of the present invention is to synthesize the two frequencies based on a single clock which is preferably derived from a high precision and very stable crystal oscillator. The frequency of the oscillator for the clock should be the lowest possible and should be formed solely from digital circuitry. The circuit for generating the reference signal and the control signal with two frequencies should be made from digital components so that the resulting system may be integrated on a digital chip. Such a system, which eliminates all analog functions, provides a simple and inexpensive means for manufacturing such a transmitter.

An object of the present invention is to modulate the binary information with a two-frequency control signal on a carrier. The FSK carrier signal is processed at the receiver by a very narrow filtering band and a demodulator circuit. The receiver includes passive filtering with very narrow band, which improves the quality of signal reception from the system. A further objective of the present invention is to generate a carrier of sinusoidal shape whose harmonic content is small.

Another object of the present invention is to provide an absolute reference enabling the receiver to directly correlate one of the two frequencies to a binary symbol. Contrary to the phase reversal technique, the present system, which results in frequency shift keying carrier signal, does not need a learning phase to permit the correlation of the carrier state. The FSK carrier signal frequency in the present invention constitutes an absolute reference which immediately establishes the value of the modulated symbol. In addition, and contrary to the conventional frequency shift keying modulation technique, the present invention provides for the synthesis of frequencies which are very close to one another to enable the use of a receiver having narrow band-pass filters. The preferred spread in the present invention is typically less than 2% of the central frequency.

As noted above, an object of the present invention is to use only digital circuitry. Certain communication systems synthesize their carrier by reading a table loaded in the read-only memory, by digital-analog conversion, by external filtering, or by other analog or hybrid functions. An entirely digital chip is substantially less expensive than a hybrid chip providing a digital to analog converter. The modulation system of the present invention requires only a minimum of digital circuitry and external components in the synthesis of its carrier, which avoids the use of more expensive operational amplifiers, digital to analog converters, and other analog or hybrid functions.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2 illustrates the typical waveforms generated by the transmitter for the reference signal, the control signal, and the carrier signal of the present invention;

FIG. 3 illustrates the typical waveforms for the data signal, the control signal, and the bit time signal;

FIG. 4 illustrates the waveforms showing the shift time which occurs when the control signal shifts from one frequency to the other frequency.

DESCRIPTION OF THE PREFERRED EMBODIMENT

The present invention provides a method and apparatus for synthesizing very close frequencies which are used to generate the desired carrier with frequency shift keying modulation in a very narrow band. The frequency shift keying carrier is created by generating two signals of different frequency using a phase reversal keying technique and then filtering the resulting signal using a high order filter.

Figure 1:
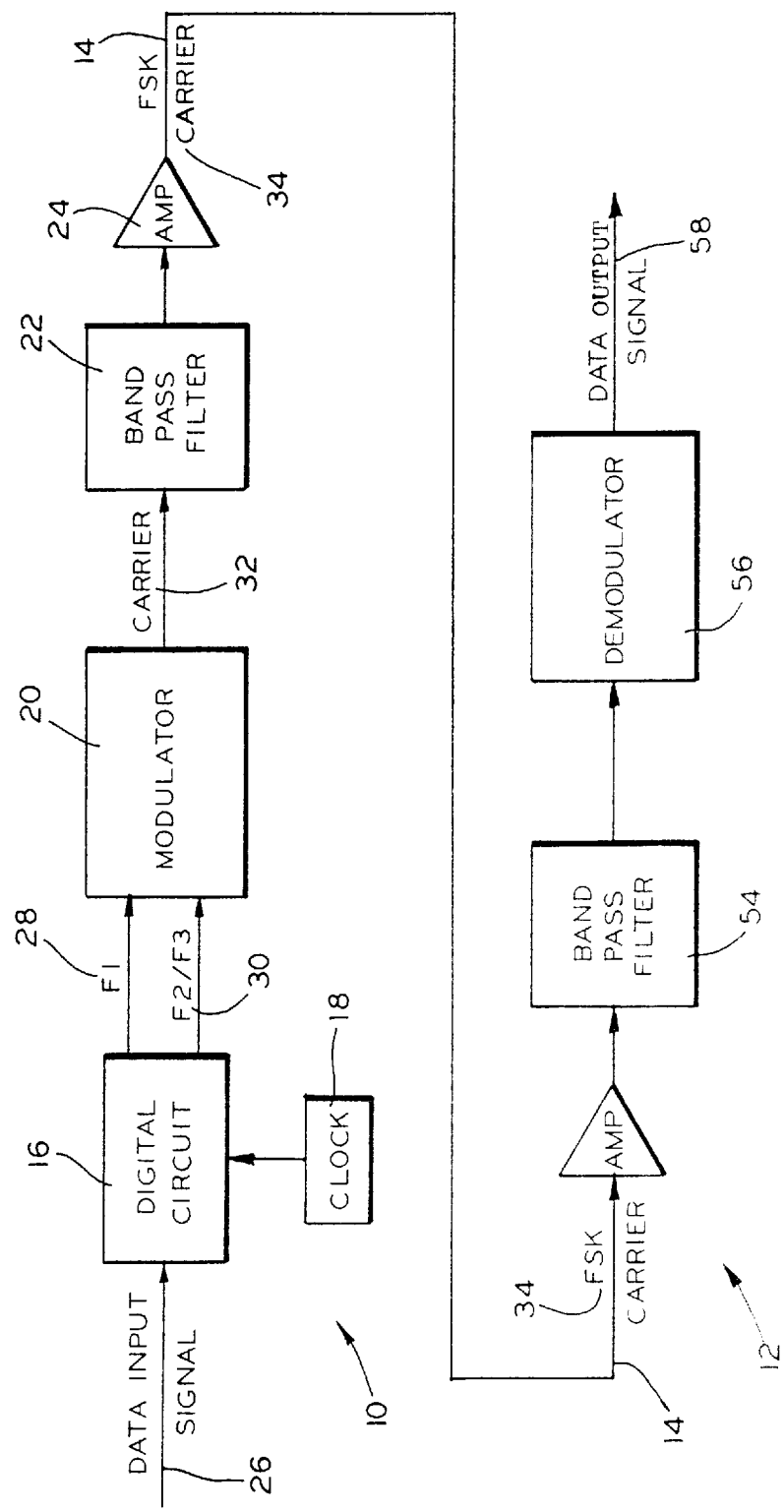
FIG. 1 is a simplified block diagram of the transmitter according to the present invention.

Referring now to FIG. 1, the apparatus includes the transmitter 10 for generating the frequency shift keying modulated carrier with the desired narrow bandwidth, the receiver 12, and the transmission medium 14 over which data is communicated from the transmitter 10 to the receiver 12. The transmission medium 14 may include AC power lines, voice grade telephone lines, or other cabling.

The transmitter 10 includes a digital circuit 16, the clock 18 and the modulator 20. The digital circuit 16 synthesizes waveforms with specific features discussed hereinafter.

The transmitter 10 also includes a band-pass filter 22 and amplifier 24. The filter 22 is preferably a narrow band passive filter. The filter 22 may be a ceramic filter, a quartz crystal filter, an electronic digital filter, or other high order filter. The use of a high order filter with a small bandwidth limits the frequency spectrum of the waveform generated by the digital circuit 16 and modulator 20. The output of the filter 22 is a signal of a sinusoidal shape having a small harmonic content which is required for the present system. The filter 22 performs the conversion of the digital signal from a high harmonic content signal to a sine wave of low harmonic content output. The signal may be amplified by amplifier 24 and applied to the transmission medium 14 or other processing.

The benefits of frequency shift keying modulation in a very narrow band cannot be achieved by the direct application of the frequency shift keying technique. The oscillator clock required for a conventional FSK technique would have a high power consumption and be too complex and costly. For example, if the desired frequencies for the modulator are 261.1 kHz. and 262.9 kHz., an unacceptable option would be to manufacture a frequency oscillator which could be input into a divider for division by two different numbers to obtain the required frequencies. The output of the divider, a square wave of suitable frequency, could then be filtered. To obtained the desired frequencies, an oscillator at 686.432 MHZ. would be required (division by 2629 and 2611). In order to take full advantage of the available spectrum by using signals up to 500 kHz. and providing two signals with two very close frequencies, the required size of the oscillator clock is not acceptable. Using a clock of 686 MHZ. substantially increases the cost of the transmitter and significantly increases the power consumption of the transmitter. In applications with power line transmission by carrier current, one of the important requirements is small electrical power consumption.

Instead of using the conventional frequency shift keying technique, the present invention uses a phase reversal keying modulation step with a narrow-band, high order filter to generate the frequency shift keying carrier signal with the desired narrow bandwidth.

In general, the frequency content of a reference signal formed by a sine wave of F1 frequency multiplied by the control signal formed by a sine wave of F2 frequency provides a signal containing two new frequencies which are F1±F2. Analog multiplication is often used in communication applications to perform a frequency shift. For example, if F1=266 kHz. and F2=4 kHz., the resulting signal will contain frequencies of 270 kHz. and 262 kHz.

In the present invention, the sine wave signals are replaced by square waves, and the analog multiplier is replaced by a phase inverter system for 180 degree phase inversion. The transmitter 10 of the present invention eliminates the complex and expensive functions of multiplication and processing of analog signals.

FIGS. 2–4 illustrate several waveforms which are helpful in explaining the operation of the transmitter 10 in the present invention. The reference signal 28 is a square wave with a frequency of F1. The control signal 30 is a square wave with either a frequency of F2 or a frequency of F3, with the frequencies F2 and F3 being indicative of the binary data signal. The mathematical principles of frequency multiplication are applied to the present invention since a square wave of F1 frequency contains the fundamental frequency, and since inverting the F1 signal by 180 degrees at a frequency of F2 corresponds mathematically to multiplying the F1 signal by a square wave of amplitude ±1 with a frequency value of F2. Because the new signal ±1 of F2 frequency contains the fundamental frequency F2, the carrier signal 32 resulting from the inversion of F1 by 180 degrees at a frequency of F2 will certainly contain the frequencies F1+F2 and F1−F2. In addition, that signal will also include a complex and extended harmonic assembly. When the control signal 30 has a frequency of F3, the resulting carrier signal 32 contains the frequencies F1+F3 and F1−F3. When the carrier signal 32 is submitted to a narrow band-pass filter 22, the frequencies F1+F2 and F1+F3 may be strongly attenuated by the bandpass filter 22, that is tuned closely in the midrange of F1−F2 and F1−F3. Alternatively, the bandpass filter 22 could be tuned at the midrange of F1+F2 and F1+F3, strongly attenuating the frequencies F1−F2 and F1−F3. The filter output provides an FSK carrier signal 34 having a sinusoidal signal of small harmonic content.

In the present invention, the frequencies for F1, F2, and F3 are selected based on the features of the band-pass filter 22. The two frequencies F2 and F3 of the control signal 30 are generally close together. By using a filter 22 with a very narrow band, the desired FSK carrier signal [(F1+F2 and F1+F3) or (F1−F2 and F1−F3)] is provided as the output of the filter 22.

In operation, the present invention allows the modulation of an FSK carrier signal 34 within a very narrow band. The first step is the phse reversal of the reference signal 28 with the control signal having a frequency of either F2 or F3. The carrier signal containing both F1+(F2 or F3) and F1−(F2 or F3) is filtered by a narrow bandpass filter to pass one component and attenuate the other component.

Referring now to FIG. 2, typical waveforms generated by the digital circuit 16 and modulator 20 of the transmitter 10 of the present invention are shown. The digital circuit 16 receives a clock signal from the oscillator clock 18 and a binary data signal 26. The digital circuit 16 generates two signals, a reference signal 28 having a set frequency F1, and a control signal 30 of a frequency F2 or a frequency F3. The control signal 30 with F2 or F3 frequency is indicative of the binary information of the data signal 26. The control signal 30 is used to control the 180 degree inversion of the reference signal 28. FIG. 2 shows the reference signal 28 and the control signal 30 at a frequency of F2. The modulator 20 combines the reference signal 28 and the control signal 30 to produce the carrier signal 32. According to the mathematical principles noted above, the carrier signal 32 contains two components which have the frequencies F1+F2 and F1−F2. It is noted in FIG. 2 that the control signal 30 shifts states at the same time as the reference signal 28 shift states. The simultaneous shift point 36 reveals a coherent phase reversal modulation.

Although preferable, it is not essential that phase reversal be coherent. If the control signal 30 controlling the phase inversion is not synchronous to the reference signal 28, new frequencies are introduced in the carrier signal 32. The carrier signal 32 would nevertheless contain the desired frequencies of F1±Fx. The new frequencies would slightly degrade the signal to noise ratio at the demodulator.

In FIG. 3, more detail is provided regarding the processing of the binary information data signal 26 to generate the control signal 30 which is comprised of F2 frequency signal 38 with F2 frequency or F3 frequency signal 40 with F3 frequency. The reference signal 28 and the resulting carrier signal 32 are not included in FIG. 3 since such signals have a much higher frequency and would appear on FIGS. 3 and 4 as generally solid line. A person skilled in the art could create the carrier signal 32 by knowing the reference signal 28 and control signal 30. Such person skilled in the art could also create the reference signal 28 and control signal 30 if the carrier signal 32 is known.

To facilitate the understanding of the transmitter 10, the signal bit-time is included in FIGS. 3 and 4 to indicate the end of a modulation period of a bit and the start of a new bit to modulate. The binary information data signal 26 results in the generation of the control signal 30 with the F2 signals 38 and F3 signals 40 corresponding to the two states of the data signal 26. The control signal 30 is used to modulate the reference signal 28, which is not shown in FIG. 3. The resulting carrier signal 32 may be filtered so as to keep only one of its components which encompasses either F1+(F2 or F3) or F1−(F2 or F3). The resulting FSK carrier signal 34 is equivalent to a modulated FSK carrier inside a narrow bandwidth.

The narrow band filter 22 has features such that the FSK carrier 34 produced at the output of the filter 22 shifts slowly from one frequency to the other (for example, from F1−F2 to F1−F3). When the data signal 26 to be modulated shifts from 1 to 0 or vice versa, the filter 22 requires a certain time to shift from frequency F1−F2 to F1−F3. This fact may limit the transfer rate of the transmitter 10.

The shift time limitation in the transfer rate of the filters 22 can be corrected by slightly modifying the manner in which the F2 signals 38 and F3 signals 40 of the control signal 30 are applied to the modulation of the reference signal 28. FIG. 4 shows the effects of the shift time when the control signal 30 of the transmitter 10 shift frequencies corresponding to a shift in the binary information data signal 26. At the first shift point 42, when the data signal 26 shifts from 0 to 1 and the control signal 30 shifts from a low frequency (F2) signal 38 to a high frequency (F3) signal 40, the filter 22 detects a greater frequency than the final frequency to be reached. This causes the filter 22 to more rapidly shift from the lower to the higher frequency. At the second shift point 44, when the data signal 26 shifts from 1 to 0 and the control signal 30 shifts from a high frequency (F3) signal 40 to a low frequency (F2) signal 38, the change stretches temporarily the control signal 30 such that the filter 22 detects a low frequency and will more rapidly tend toward the desired final frequency. The bit time signal 46 shown in FIG. 4 indicates the transmission time for one bit of information. The digital circuit 16 may include a control circuit connected to the time signal 46 to ensure that the control signal 30 is synchronized with the data signal 26 to maximize the transfer rate of the data.

Figure 5A:
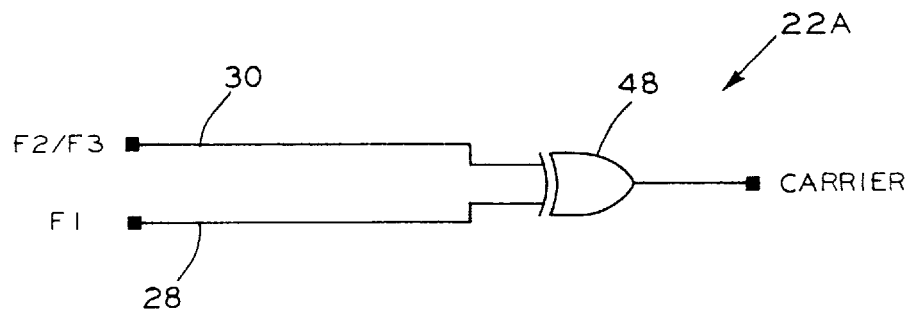
FIGS. 5A–5C show three alternative configurations for generating the signal carrier.
Figure 5B:
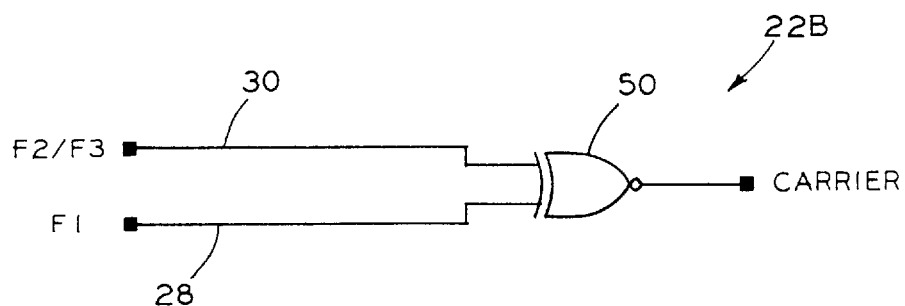
Figure 5C:
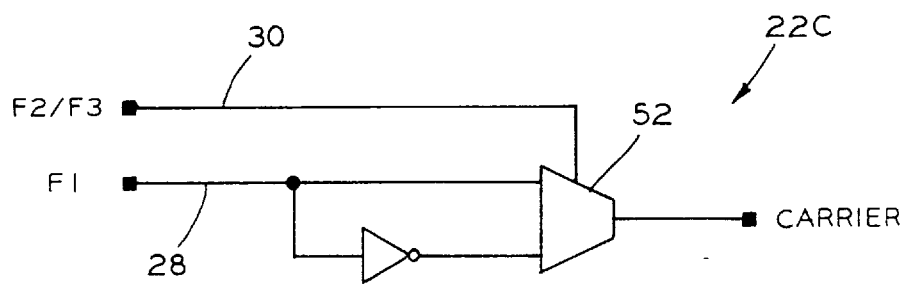

FIGS. 5A–5C show three of the various circuits which could be used to implement the phase reversal in the modulator 20. The carrier signal 32 is generated from the reference signal 28 and the control signal 30. The control signal 30 is comprised of F2 signals 38 or F3 signals 40. The carrier signal 32 includes a complex assembly of harmonics and the components F1±(F2 or F3). The modulator 22A, 22B in FIGS. 5A–5B uses logic gates, exclusive or 48, exclusive nor 50. FIG. 5C shows an alternative embodiment of the modulator 22C which includes a signal generator 52 for receiving the reference signal 28 and the control signal 30 and for generating the carrier signal 32.

In a preferred embodiment, and for illustrative purposes only, the reference signal 28 may have an F1 frequency of 266.666 kHz., the control signal may have an F2 frequency of 3.704 kHz. and an F3 frequency of 5.555 kHz. If the sum of the frequencies is filtered by the filter 22, the resulting frequencies of the FSK carrier signal 34 would be 262.962 kHz. (F1−F2) and 261.111 kHz. (F1−F3). The filter 22 of the transmitter 10 and the corresponding filter 54 at the receiver 12 are high order filters with narrow bandwidths. The filters 22, 54 may be identical ceramic band-pass filters rated at 262 kHz. and having a bandwidth of 2.7 kHz. A demodulator 56 processes the FSK carrier signal to generate a binary data output signal 58.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A transmitter for transmitting an FSK output signal, said transmitter comprising:

a circuit for receiving a binary data signal, for generating a reference signal, and for generating a control signal having a first frequency and a second frequency in response to the binary data signal;

a modulator coupled to said circuit for phase reversal keying modulation of the reference signal with the control signal to create a carrier signal having a first carrier frequency component and a second carrier frequency component; and a high order filter with a narrow bandwidth to filter the carrier signal, whereby an FSK carrier signal with a narrow bandwidth is created.

2. The transmitter defined in claim 1,
wherein said circuit includes an oscillator formed from digital circuitry.

3. The transmitter defined in claim 1,
wherein said circuit and said modulator include digital circuits.

4. The transmitter defined in claim 1,
wherein said high order filter is a ceramic filter.

5. The transmitter defined in claim 1,
wherein said high order filter is a quartz crystal filter.

6. The transmitter defined in claim 1,
wherein said high order filter is an electronic digital filter.

7. The transmitter defined in claim 1,
wherein the FSK carrier signal is a sinusoidal signal of small harmonic output.

8. The transmitter defined in claim 1,
wherein said modulator includes a logic gate for modulating the reference signal and the carrier signal.

9. The transmitter defined in claim 3,
wherein said modulator includes a logic gate for modulating the reference signal and the carrier signal.

10. The transmitter defined in claim 1,
wherein the FSK carrier signal has a spread of less than 2% of a central frequency.

11. The transmitter defined in claim 1,
wherein said modulator includes a phase inversion system.

12. The transmitter defined in claim 1,
wherein said circuit generates the reference signal and control signal as square waves.

13. A communication system for transmitting and receiving an FSK carrier signal for communicating binary data, said communication system comprising:

a circuit for receiving a binary data input signal, for generating a reference signal, and for generating a control signal having a first frequency and a second frequency in response to the binary data input signal;

a modulator coupled to said circuit for phase reversal keying modulation of the reference signal with the control signal to create a carrier signal having a first carrier frequency and a second carrier frequency;

a high order transmitter filter with a narrow bandwidth to filter the carrier signal for creating an FSK carrier signal with a narrow bandwidth which is applied to a transmission medium;

a high order receiver filter with a narrow bandwidth for receiving and filtering the FSK carrier signal from the transmission medium; and a demodulation unit for processing the FSK carrier and generating a binary output data signal.

14. A method for generating and transmitting an FSK output signal with a narrow bandwidth, said method comprising the steps of:

receiving a binary data signal;

generating a control signal in response to said binary data signal, said control signal having a first frequency and a second frequency representing binary data;

generating a reference signal;

modulating said reference signal and said control signal by phase reversal keying to create a carrier signal;

filtering said carrier signal with a high order filter having a narrow bandwidth to create a FSK carrier signal; and applying the FSK carrier to a transmission medium.

15. The method for generating and transmitting an FSK output signal with a narrow bandwidth defined in claim 14, including the additional step of amplifying the FSK carrier signal prior to applying the FSK carrier to the transmission medium.

16. The method for generating and transmitting an FSK output signal with a narrow bandwidth defined in claim 14, wherein modulating the signals includes the step of inverting the reference signal by 180 degrees.

17. A method for generating, transmitting, and receiving an FSK output signal with a narrow bandwidth, said method comprising the steps of:

receiving a binary data input signal;

generating a control signal in response to said binary data input signal, said control signal having a first frequency and a second frequency representing binary data;

generating a reference signal;

modulating said reference signal and said control signal by phase reversal keying to create a carrier signal;

filtering said carrier signal with a high order filter having a narrow bandwidth to create an FSK carrier signal;

applying the FSK carrier to a transmission medium;

receiving the FSK carrier from a transmission medium;

filtering said FSK carrier signal with a high order filter having a narrow bandwidth; and demodulating said FSK carrier signal to generate a binary data output signal.

* * * * *